(12) United States Patent
Kuttler et al.

(10) Patent No.: US 7,289,917 B2
(45) Date of Patent: Oct. 30, 2007

(54) CORIOLIS FLOW METER AND METHOD FOR FLOW MEASUREMENT

(75) Inventors: Daniel Kuttler, Basel (CH); Christian Matt, Aesch (CH)

(73) Assignee: Endress +Hasuer Flowtec AG, Kagenstrasse 7, Reinach (CH)

( * ) Notice: Subject to any disclaimer, the term of this patent is extended or adjusted under 35 U.S.C. 154(b) by 0 days.

(21) Appl. No.: 11/443,069

(22) Filed: May 31, 2006

(65) Prior Publication Data

US 2006/0278020 A1  Dec. 14, 2006

Related U.S. Application Data

(60) Provisional application No. 60/685,495, filed on May 31, 2005.

(30) Foreign Application Priority Data

May 31, 2005  (DE)  ........................ 10 2005 025 395

(51) Int. Cl.
*G01F 1/84* (2006.01)
(52) U.S. Cl. .............. 702/45; 73/861.356; 73/861.357; 73/32
(58) Field of Classification Search .................. 702/45; 73/1.35, 861.357
See application file for complete search history.

(56) References Cited

U.S. PATENT DOCUMENTS 6,073,495 A * 6/2000 Stadler .................. 73/861.356

2001/0045134 A1  11/2001  Henry
2004/0025599 A1  2/2004  Matt

FOREIGN PATENT DOCUMENTS

| DE | 01 918 944 T1 | 10/2004 |
|---|---|---|
| EP | 0 698 783 A1 | 2/1996 |
| EP | 1 489 390 A2 | 12/2004 |
| WO | WO 03/029760 A1 | 4/2003 |

* cited by examiner

*Primary Examiner*—Bryan Bui
*Assistant Examiner*—Sujoy Kundu
(74) *Attorney, Agent, or Firm*—Bacon & Thomas, PLLC

(57) ABSTRACT

A Coriolis flow meter, which includes: at least one measuring tube, which is excited to oscillate during measurement operation, and through which a medium flows, first and second sensors for registering a flow-dependent oscillation of the measuring tube and for producing first and second sensor signals; and two separated, signal-processing branches. According to a method of flow measurement a reference signal is superimposed on the first or second of the sensor signals, by the passing through both signal processing branches of an auxiliary signal formed by the superimposing, and by the filtering of a first, conditioned, reference signal from a first signal occurring on the output of the first signal processing branch and the filtering of a second, conditioned, reference signal from a second signal occurring on the output of the second signal processing branch, and by determining a ratio of the amplification gains of the signal processing branches on the basis of the conditioned, reference signals.

17 Claims, 4 Drawing Sheets

CORIOLIS FLOW METER AND METHOD FOR FLOW MEASUREMENT

FIELD OF THE INVENTION

The invention relates to a Coriolis flow meter and to a method for flow, e.g. flow rate, measurement.

BACKGROUND OF THE INVENTION

Coriolis flow meters are used in industrial measurements technology for measuring a flow of a medium, e.g. of a liquid or gas, in a section of pipeline.

Coriolis flow meters, utilize a measuring tube, which is located during a measuring operation in a section of pipeline, such that the medium flows through the measuring tube. The measuring tube is caused to oscillate. The oscillation of the measuring tube is influenced by the liquid flowing through it. Measuring tube and liquid form together an oscillatable system, which, as a rule, is excited to its resonance frequency. The resulting oscillatory movement of the measuring tube is usually registered by two oscillation sensors arranged on the measuring tube. The sensor signals from these oscillation sensors are recorded and conditioned by a signal processing unit. Flow is determined on the basis of the conditioned sensor signals. The sensor signals have a frequency equal to a frequency of the oscillation of the measuring tube. They are, however, shifted in phase with respect to one another. The phase shift is a measure of the flow rate of the medium through the measuring tube.

FIG. 1 shows a measurement pickup, or transducer, of a Coriolis flow meter, such as is described, for example, in EP A1 1 298 421. The measurement pickup 1 is arranged in a measuring operation in a pipeline (not shown), through which the medium is flowing, whose flow is to be measured. Measurement pickup 1 has a single, straight measuring tube, which is affixed on the inlet side via an end plate 5 to a flange 7 and on the outlet side via an end plate 9 to a flange 11. The flanges 7, 11 and the end plates 5, 9 are secured on or in a support tube 13.

The invention described below is not limited to this specific measurement pickup 1 having a single, straight measuring tube 3. It can also be used in connection with other known measurement pickups, or transducers. To be mentioned are e.g. measurement pickups having a measuring tube with cantilevered mass, such as e.g. described in EP-A 97810559, measurement pickups with a bent measuring tube, such as described e.g. in EP-A 96 10 942, as well as measurement pickups having two parallel, straight or bent measuring tubes, such as are described e.g. in U.S. Pat. No. 4,793,191 or U.S. Pat. No. 4,127,028.

The measuring tube 3 is excited, during measurement operation, to oscillate. For producing the measuring tube oscillation, an oscillation exciter 15 is arranged at a point on the measuring tube 3 halfway between the two end plates 5, 9. Suited as oscillation exciter 15 is e.g. an electromagnetic drive composed of a permanent magnet 17 and a coil 19. Coil 19 is secured to the support tube 13 and the permanent magnet 17 is secured to the measuring tube 3. Via an electrical current flowing in the coil 19, amplitude and frequency of a bending oscillation of the measuring tube 3 occurring in the plane of the drawing can be controlled. The oscillation is preferably driven in resonance.

When the medium flows through the measuring tube, Coriolis forces arise in the plane of the drawing. These Coriolis forces insure that not all points along the measuring tube 3 oscillate in phase. The oscillation of the measuring tube 3 is registered with the help of first and second sensors 21, 23. Sensors 21, 23 are preferably arranged symmetrically about the oscillation exciter 15. Suitable as sensors 21, 23 are e.g. electromagnetic transducers, which, in each case, include a coil 25, 27 secured to the support tube 13 and a permanent magnet 29 arranged on the measuring tube 3. A movement of the measuring tube 3 causes movements of the permanent magnets 29 in the coils 25, 27 and, therewith, induced voltages in the respective coils 25, 27. The induced voltages can be tapped from the coils 25, 27 and are therewith available as first and second, analog, sensor signals S1, S2 produced by the sensors 21, 23. The two sensor signals S1, S2 have the same frequency $f_s$ and are shifted in phase with respect to one another. The phase difference existing between the sensor signals S1, S2 is a measure for the flow rate. The frequency $f_s$ lies typically in the order of magnitude of a few hundred Hertz.

FIG. 2 shows, by way of example, a possible form of signal processing, such as is already used today in Coriolis flow meters. In such case, the sensor signals S1, S2 are analog pre-processed, then digitized, with the flow then being digitally determined.

Each of the sensor signals S1, S2 is fed through an impedance converter 31 having a gain g of e.g. g=1, to a preamplifier 33, 35. Preamplifier 35 amplifies the incoming second sensor signal S2 with a selectable, but fixed, gain $g_{v2}$, which lies typically between 3 and 10. The preamplifier 33 has a gain $g_{v1}$. The gain $g_{v1}$, which the first sensor signal S1 experiences thereby, is controlled in such a way that a part of a difference of the two sensor signals S1, S2 related to an amplitude difference in the two sensor signals S1, S2 disappears. The preamplified sensor signals S1, S2 then have the same amplitude and differ from one another with respect to phase, which depends on flow.

Following on the described preprocessing circuitry are first and second signal processing branches 37, 39. The first signal processing branch 37 includes a difference amplifier 41, on whose inputs are placed the impedance-converted, preamplified, sensor signals S1, S2. The difference amplifier 41 has, as a rule, a two-digit gain $g_A$, e.g. $g_A$=27. At the output, a first measurement signal $U_A$ becomes available, which corresponds to an amplified difference of the sensor signals S1, S2. This first measurement signal $U_A$ is digitized by means of an analog-digital converter $A/D_A$ following in the first signal processing branch 37 and then fed e.g. via an interface 43 to a digital signal processing unit 45. In such case, the analog-digital converter $A/D_A$ can have a gain $g_{A/D_A}$ different from 1.

The second signal processing branch 39 includes an adder 47, on whose inputs the impedance-converted, preamplified sensor signals S1, S2 are placed. Adder 47 has typically a gain $g_\Sigma$ of $g_\Sigma$=1. Available, therefore, at the output is a second measurement signal $U_\Sigma$, which corresponds to the sum of the sensor signals S1, S2. The second measurement signal $U_\Sigma$ is then digitized by means of an analog-digital converter $A/D_\Sigma$ following in the second signal processing branch 39 and fed e.g. via the interface 43 to the digital signal processing unit 45. Also in this case, the analog-digital converter $A/D_\Sigma$ can exhibit a gain $g_{A/D_\Sigma}$ different from 1.

To the extent that a phase angle to be measured between the sensor signals S1, S2 does not exceed a range of some tens of milli-radians, the addition can be omitted, without there being significant errors. In such case, the second signal processing branch 39 is provided with, instead of the adder 47, an amplifier with a gain of $g_\Sigma$, e.g. $g_\Sigma$=2, and the second measurement signal $U_\Sigma$ would be the amplified second sensor signal S2. The dashed line illustrating the addition of the sensor signals S1, S2 would then not be used.

In the digital signal processing 45, the magnitude of the second measurement signal $U_{93}$ and a real part $Re(U_A)$ and an imaginary part $Im(U_A)$ of the first measurement signal $U_A$ are then determined. The real part $Re(U_A)$ of the first measurement signal $U_A$ is controlled to zero via the controllable amplifier $g_{v1}$. Finally, the flow M is determined by means of the digital signal processing unit 45. Such can be calculated, for example, as follows:

$$M = k\, Im(U_A) g_\Sigma g_{AD\Sigma}$$

$$|U_\Sigma| f_s\, g_\Delta g_{AD\Delta}$$

wherein k is a proportionality constant and $f_s$ is the frequency of the sensor signals.

In such case, the gains $g_\Sigma$, $g_{AD\Sigma}$, $g_\Delta$, $g_{AD\Delta}$ of the individual components of the second and first signal branches 37, 39 have a direct influence on the calculated flow M. If one assumes that these gains are constant, then it is sufficient implicitly to adjust and store these constants, e.g. in the context of a calibration, so that, in the calculation of the flow M, the total gain, as given in the above formula, is normalized to 1.

Investigations have shown that this is sufficient, when the ratio of the gains of the first and second signal processing branches 37, 39 do not change. If the ratio changes, e.g. because the amplification of one or more component(s) drifts, or drift, over time and temperature, then this leads to a measurement accuracy in the determining of the flow M, which can, as a rule, only be made more accurate by complicated calibrations.

SUMMARY OF THE INVENTION

It is an object of the invention to provide a Coriolis flow meter, which enables a high accuracy of measurement.

To this end, the invention resides in a Coriolis flow meter having
- at least one measuring tube, which, during operation, is excited to oscillate while the medium whose flow is to be measured is flowing through it,
- first and second sensors for the registering of an oscillation of the measuring tube dependent on flow and for the production of first and second sensor signals,
- a reference signal generator, which superimposes a reference signal on the second sensor signal,
- a first signal processing branch,
  - which, on the basis of the first sensor signal and an auxiliary signal formed by the superimposing of the reference signal on the second sensor signal, derives and conditions a first signal, which corresponds to a difference of the first sensor signal and the auxiliary signal,
- a second signal processing branch, which, on the basis of the auxiliary signal or on the basis of the first sensor signal and the auxiliary signal, derives and conditions a second signal,
- two sets of, in each case, two filters, of which a first set serves for filtering from the conditioned first signal a conditioned first reference signal and a first measurement signal corresponding to a difference of the sensor signals, and of which a second serves for filtering from the conditioned second signal a conditioned second reference signal and a second measurement signal,
- means, which determine, on the basis of the first and the second conditioned reference signals, a ratio of the gains of the first and second processing branches, and
- means for determining flow on the basis of the first and second measurement signals, which take into consideration the ratio of the gains.

In an embodiment, the second signal equals a sum of the first sensor signal and the auxiliary signal, or a phase angle between the first and second sensor signals is less than some tens of milli-radians and the second signal is equal to the auxiliary signal.

In a further embodiment, the first signal processing branch includes a difference amplifier and an analog-digital converter, and the second signal processing branch includes an adder or an amplifier and an analog-digital converter.

In a further development, the sensors each include a coil, the reference signal generator is connected with a first terminal of the coil of the second sensor, and a second terminal of this coil is connected with a first input of the second signal processing branch.

In an embodiment, an impedance converter and a preamplifier are arranged between the second terminal of the coil of the first sensor and the input of the first signal processing branch, a preamplification of the first sensor signal is controlled in such a way that a real part of the first measurement signal disappears, and an impedance converter and a preamplifier of predetermined gain are arranged between the second terminal of the coil of the second sensor and the input of the second signal processing branch.

In a further development, a summing or a difference amplifier is arranged before the second signal processing branch, the second sensor signal and the reference signal are applied to the inputs of such amplifier, and, on its output, the auxiliary signal is available.

Additionally, the invention resides in a Coriolis flow meter having
- at least one measuring tube, which, during operation, is excited to oscillate while the medium whose flow is to be measured is flowing through it,
- first and second sensors for the registering of an oscillation of the measuring tube dependent on flow and for the production of first and second sensor signals,
- a reference signal generator, which superimposes a reference signal on the first sensor signal,
- a first signal processing branch,
  - which, on the basis of an auxiliary signal formed by the superimposing of the reference signal on the first sensor signal and on the basis of the second sensor signal, derives and conditions a first signal, which corresponds to a difference of the auxiliary signal and the second sensor signal,
- a second signal processing branch,
  - which, on the basis of the auxiliary signal or on the basis of the auxiliary signal and the second sensor signal, derives and conditions a second signal,
- two sets of, in each case, two filters, of which a first set serves for filtering from the conditioned first signal a conditioned first reference signal and a first measurement signal corresponding to a difference of the sensor signals, and of which a second serves for filtering from the conditioned second signal a conditioned second reference signal and a second measurement signal,
- means, which determine, on the basis of the first and the second conditioned reference signals, a ratio of the gains of the first and second processing branches, and means for determining flow on the basis of the first and second measurement signals, which take into consideration the ratio of the gains.

Additionally, the invention resides in a method for determining a ratio of amplification gains of two separate signal processing branches of a Coriolis flow meter, which has first and second sensors for registering a flow-dependent oscillation of a measuring tube and for producing first and second sensor signals, in which either reference signal is superimposed on the second sensor signal, a first signal is derived and conditioned in a first signal processing branch to correspond to a difference between the first sensor signal and an auxiliary signal formed by the superimposing of the reference signal on the second sensor signal, and a second signal is derived and conditioned in a second signal processing branch to correspond to a sum of the first sensor signal and the auxiliary signal or to the auxiliary signal, or a reference signal is superimposed on the first sensor signal, a first signal is derived and conditioned in a first signal processing branch to correspond to a difference between, on the one hand, an auxiliary signal formed by the superimposing of the reference signal on the first sensor signal and, on the other hand, the second sensor signal, and a second signal is derived and conditioned in a second signal processing branch to correspond to a sum of the auxiliary signal and the second sensor signal, or to the auxiliary signal, and in which first and second, conditioned reference signals are filtered from the first and second signals, and on the basis of the conditioned reference signals, a ratio of the amplification gains of the signal processing branches is determined.

The invention resides further in a method for determining flow with a Coriolis flow meter of the invention, in which method the flow is proportional to a ratio of an imaginary part of the first measuring signal and to a magnitude of the second measuring signal and inversely proportional to the ratio of the gains.

In a further development of the method, the ratio of the gains is determined a plurality of times and flow is determined on the basis of an average value of the ratios.

In a further development, the ratio of the gains is determined a plurality of times. A distribution of the ratios is determined, and flow is determined only then on the basis of an average value of the ratios, when the ratios are normally distributed and a standard deviation of the ratios lies beneath a predetermined value.

In a further development of the method, a reference value for the ratio of the gains is stored in the flow measuring device. The measured ratio of the gains is compared with the reference value and, should a deviation arise, a compensation is performed.

An advantage of the invention is that the ratio of the gains of the two signal processing branches is permanently monitored. A complicated calibration of the signal processing branches and its implementation in the device is, therefore, not needed.

BRIEF DESCRIPTION OF THE DRAWINGS

The invention and further advantages will now be explained in greater detail on the basis of the figures of the drawing, in which four examples of embodiments are presented; equal parts are provided in the figures with equal reference characters.

The figures of the drawing show as follows.

DESCRIPTION OF THE PREFERRED EMBODIMENTS

The invention relates to a Coriolis flow meter including a measurement pickup and a signal processing and is described in greater detail in the following, building on the measurement pickup shown in FIG. 1 and the signal processing shown in FIG. 2. FIGS. 3 and 4 show examples of signal processing of a Coriolis flow meter of the invention. Since both examples of signal processing bear a great resemblance to the signal processing shown in FIG. 2, only the differences of significance are explained in greater detail in the following. It is to be noted, however, in this regard, that the illustrated form of the measurement pickup and signal processing are only in terms of examples, and the invention is equally usable in connection with other measurement pickups and other kinds of signal processing.

Figure 1:
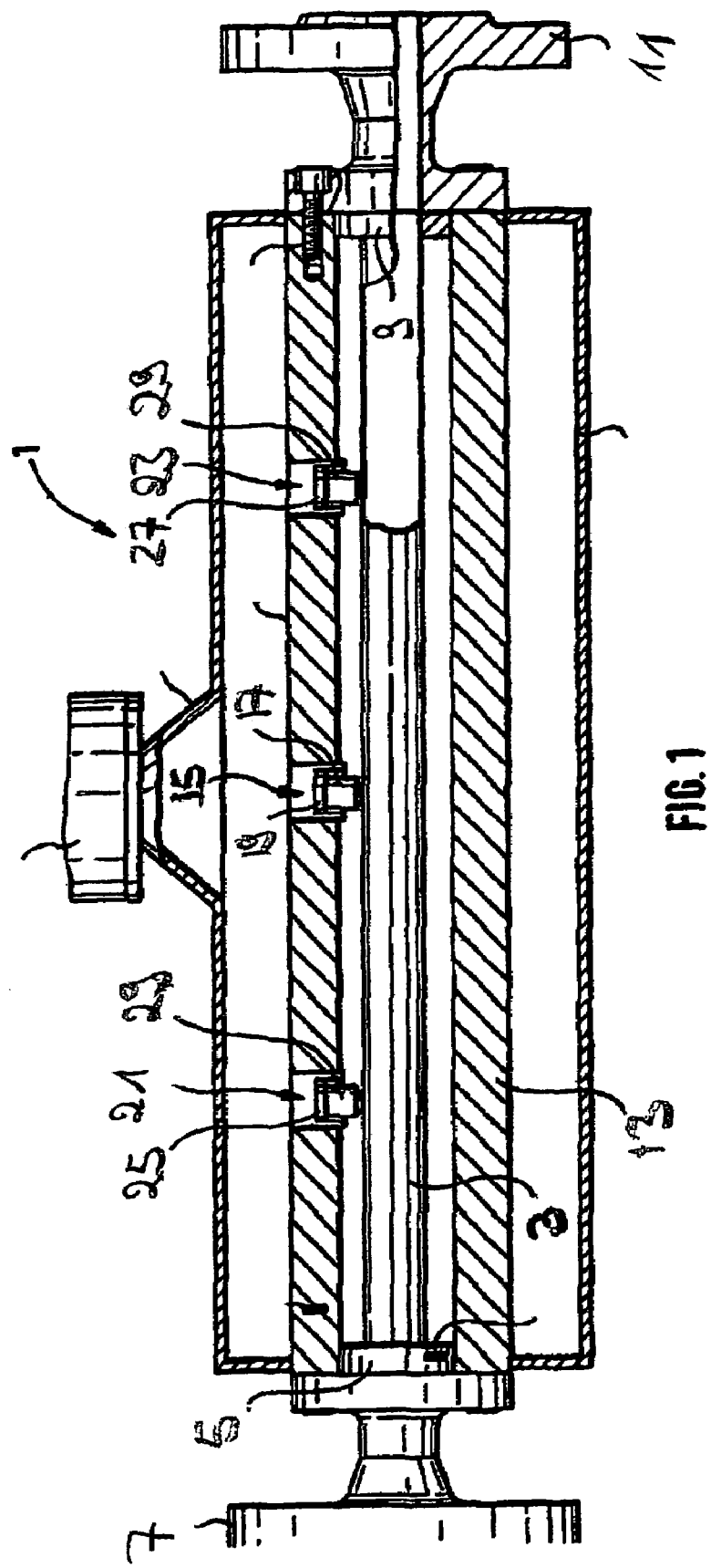
FIG. 1 a measurement pickup, or transducer of a Coriolis flow meter.

A Coriolis flow meter of the invention includes, as shown in FIG. 1, at least one measuring tube 3, which, during measurement operation, is excited to oscillate while a medium, the flow rate of which is to be measured, is flowing through it. The invention is not, however, limited to a single measuring tube. It can also be applied in completely analogous manner in the case of Coriolis flow meters having two or more measuring tubes. The illustrated measurement pickup includes first and second sensors 21, 23 for registering an oscillation of the measuring tube 3 dependent on flow M and for producing first and second sensor signals S1, S2 representing the oscillation. Here, it is naturally analogously true that very many more than only two sensors can be used. The invention can then be applied for every possible pair of two sensors selectable from the totality of the sensors which are present.

In a first variant of the invention, the Coriolis flow meter includes a reference signal generator, which superimposes a reference signal R on the second sensor signal S2.

The reference signal generator is preferably a voltage generator, which superimposes a voltage on the sensor signal S2. This offers for the described flow meter the advantage that an electrical current flow, which could, in the right circumstances, affect, via the coil 27, the oscillation of the measuring tube, is avoided. Reference signal R is preferably an oscillating voltage having a predetermined frequency $f_R$, which is distinguishable from the frequency $f_s$ of the sensor signals S1, S2. In the case of a frequency $f_s$ of the sensor signals of e.g. 800 Hz, frequency $f_R$ of the reference signal R can amount to e.g. 300 Hz. The reference signal generators can be either analog or digital reference signal generators 48a, 48b. Both variants are indicated in FIG. 3. The analog reference signal generator 48a can suitably be e.g. a voltage-controlled oscillator (VCO). This option is shown in FIG. 3 by dashed lines. Alternatively, reference signal R can be generated in digital form, e.g. in cosine, or sine, form, by a digital reference signal generator 48b. The digital reference signal generator 48b is preferably part of an already present digital processor, here the signal processor 45. The digital reference signal Rd is, as shown in FIG. 3, converted by means of a digital-analog converter D/A and, as required, an amplifier A into an analog reference signal R and superimposed on the sensor signal S2.

In the case of the signal processing shown in FIG. 3, the superimposing of the reference signal R occurs directly via the coil 27 of the sensor 23. Reference signal generator 48a, or 48b, is connected directly with a first terminal 55 of the coil 27. A first terminal 53 of the coil 25 lies at ground or at a reference potential. A second terminal 57 of coil 25 is connected via the impedance converter 31 and the preamplifier 33 with an input of the first signal processing branch 37. A second terminal 59 of the coil 27 is connected via the impedance converter 31 and the preamplifier 35 with an input of the second signal processing branch 37.

The superimposing can, however, also be accomplished in other ways. FIG. 4 shows an example of an embodiment in which the superimposing is effected via a sum or difference amplifier placed before the second signal processing branch 39. The sum or difference amplifier can, in such case, be an additional element, which is inserted into the circuit. Preferably, however, a controllable sum or difference amplifier 61 is used, which is substituted in place of the preamplifier 35. The reference signal R lies on a first input 63 of the sum or difference amplifier 61 connected before the second signal processing branch 39. Coils 25, 27 are connected via their first terminals 53, 55 to ground or to a reference potential. The second terminal 59 of the coil 27 is connected via the impedance converter 31 to a second input 65 of the sum or difference amplifier 61 in front of the second signal processing branch 39.

In the illustrated examples of embodiments, sensors 21, 23 are, in each case, equipped with only one coil 25, 27. In analogous manner, it is, naturally, also possible to use sensors having two or more coils. The superimposing of the reference signal R occurs then analogously, corresponding to the construction of the sensors.

By the superimposing of the second sensor signal S2 with the reference signal R, an auxiliary signal H is obtained. The auxiliary signal H and the sensor signal S1 are subjected to an analog preprocessing. This occurs, for example, identically to the preprocessing of the sensor signals S1, S2 described on the basis of FIG. 2, with the auxiliary signal H being used in place of the sensor signal S2 of FIG. 2

Following the preprocessing there is a further processing of the first sensor signal S1 and the auxiliary signal H in first and second signal processing branches 37, 39.

Arranged between the second terminal 57 of coil 25 and the input of the first signal processing branch 37 is the impedance converter 31 and the preamplifier 33. The preamplification gain $g_{v1}$ of the first sensor signal is controlled in such a manner that a real part of the first measurement signal $U_A$ disappears. Arranged between the second terminal 59 of the coil 27 and the input of the second signal processing branch 39 are an impedance converter 31 of gain g, e.g. with g=1, and the preamplifier 35 of predetermined gain $g_{v2}$.

Figure 2:
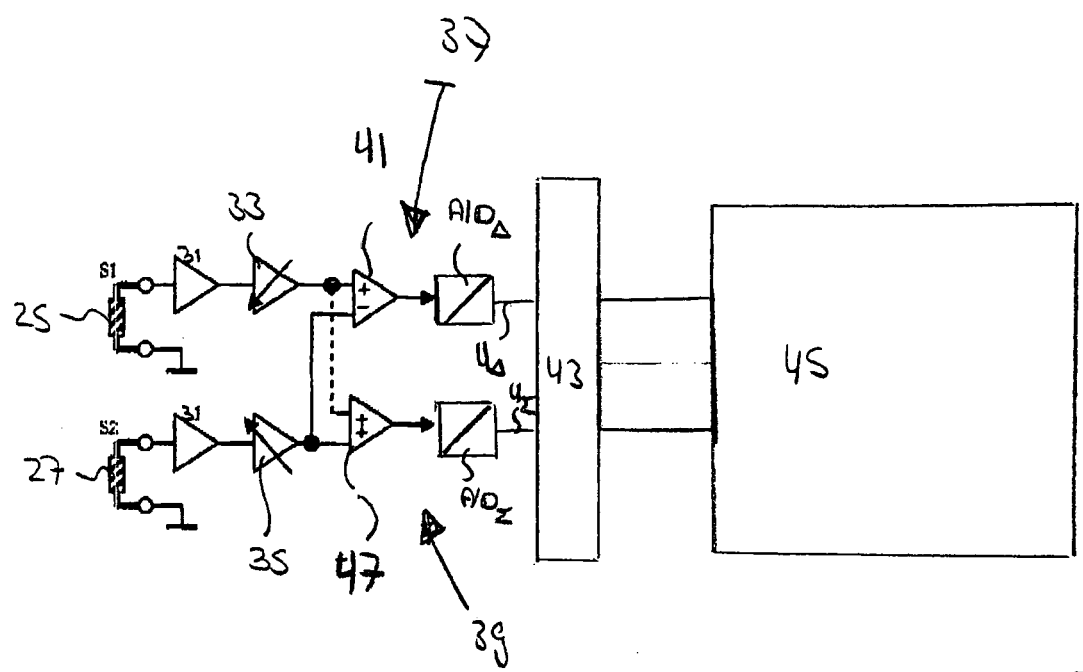
FIG. 2 a conventional signal processing of a Coriolis flow meter.
Figure 3:
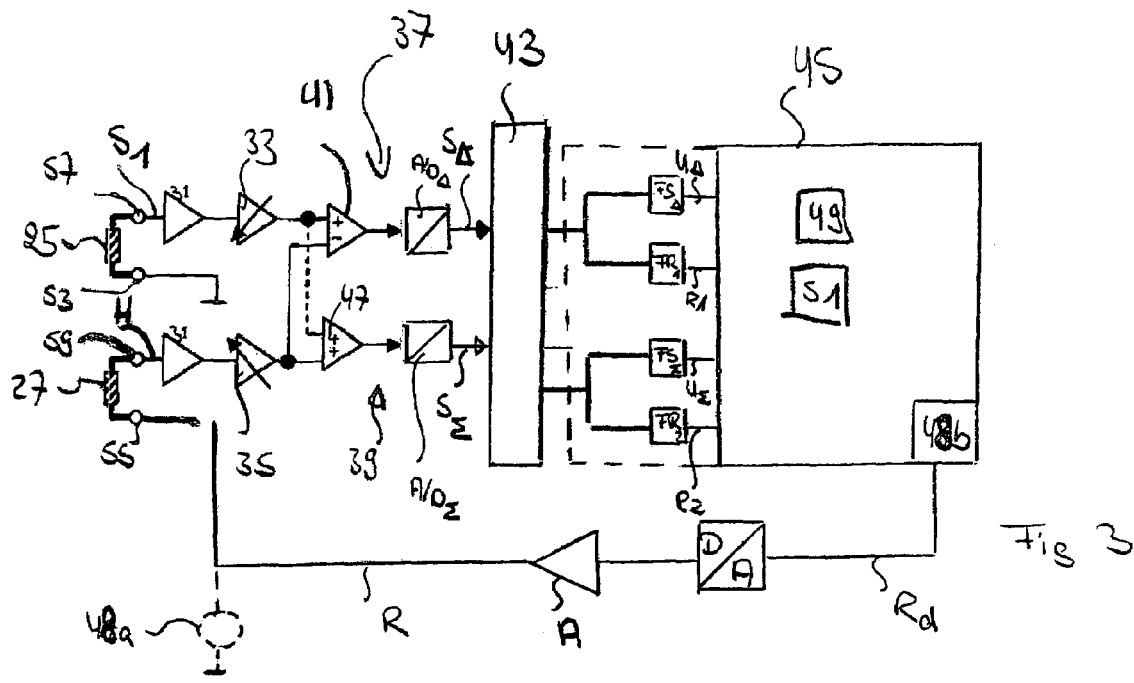
FIG. 3 a signal processing of the invention, in a Coriolis flow meter, in which a reference signal generator is connected to the coil of the second sensor.
Figure 4:
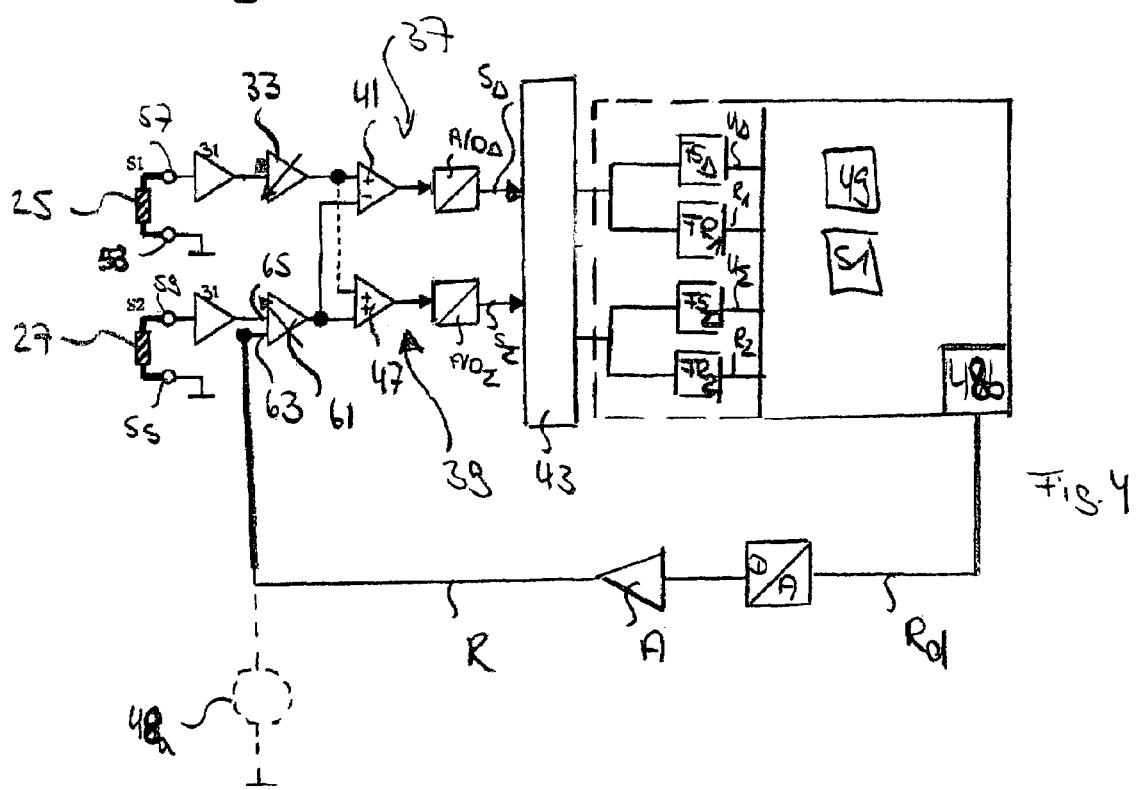
FIG. 4 a further signal processing of the invention, in a Coriolis flow meter, in which the reference signal is superimposed on the second sensor signal via a difference amplifier.

The signal processing branches 37, 39 shown in FIG. 3 are constructed, for sake of simplicity, identically to the signal processing branches 37, 39 shown in FIG. 2. In contrast with the signal processing represented in FIG. 2, here, the impedance-converted, preamplified, first sensor signal S1 and the impedance-converted, preamplified auxiliary signal H are fed to the signal processing branches 37, 39. The impedance-converted, preamplified, auxiliary signal H is used in place of the impedance-converted, preamplified, second sensor signal S2 of FIG. 2.

The first signal processing branch 37 derives, on the basis of the first sensor signal S1 and the auxiliary signal H formed by the superimposing of the reference signal R on the second sensor signal S2, a first signal $S_A$, which corresponds to a difference of the first sensor signal S1 and the auxiliary signal H, and conditions such.

Correspondingly, the second signal processing branch 39 derives, on the basis of the auxiliary signal H or on the basis of the first sensor signal S1 and the auxiliary signal H, a second signal $S_\Sigma$, and conditions such. The second signal $S_\Sigma$ corresponds, in such case, analogously to the explanations regarding FIG. 2, to the sum of the first sensor signal S1 and the auxiliary signal H, or to the auxiliary signal H, amplified, for example, by a factor of 2. This last variant is, however, only usable in the case in which the phase angle between the first and the second sensor signals S1, S2 amounts to less than some tens of milli-radians. The derivation and the conditioning is done, in the case of the example of an embodiment shown in FIG. 3, by the difference amplifier 41, the analog-digital converter $A/D_A$, the adder 47 or an amplifier not shown in FIG. 3, and the analog-digital converter $A/D_\Sigma$. Of course, the two signal processing branches 37, 39 can contain further elements for deriving and conditioning, such further elements not being shown here for the purpose of keeping to the fundamentals. The conditioned first and second signals $S_\Sigma$ and $S_A$ are available via the interface 43.

According to the invention, two, preferably identical, sets of, in each case, two filters $FS_A$, FR1; $FS_\Sigma$, FR2 are provided. The first set includes the filters $FS_A$, FR1 and serves for filtering from the conditioned, first signal $S_A$ a conditioned reference signal R1 and a first measurement signal $U_A$ corresponding to a difference of the sensor signals S1, S2.

The second set includes the filters $FS_\Sigma$, FR2 and serves for filtering from the conditioned second signal $S_\Sigma$ a conditioned second reference signal R2 and a second measurement signal $U_\Sigma$. Depending on whether an adder 47 or an amplifier is inserted in the second signal processing branch 39, the second measurement signal $U_\Sigma$ corresponds either to the sum of the sensor signals S1, S2 or to the amplified second sensor signal S2.

The filters $FS_A$, FR1; $FS_\Sigma$, FR2 are shown here as individual components, for purposes of better clarity of explanation. Modern signal processing units 45, e.g. digital signal processors, display a high degree of functionality and are very versatilely usable. Especially, they are very well suited to assume the functions of the filters $FS_A$, FR1; $FS_\Sigma$, FR2. In line with this, the filters $FS_A$, FR1; $F_\Sigma$, FR2 can be integrated into the digital signal processing unit 45. This is indicated in FIG. 3 by a dashed line.

The components contained in the two signal processing branches 37, 39 exhibit different gains, which can be set initially, it is true, on the basis of their specifications and adjustments or by a calibration, which can, however, change e.g. with time or due to changes in temperature. By reference here to the gains of the signal branches 37, 39, one means the total gain, which is bought about by the interaction of all components contained in the particular signal processing branches 37, 39.

This corresponds to the products of the individual gains of the individual components of the signal processing branches 37, 39. As already explained in the introductory description, these gains, or the ratio of the gains of the first and second signal processing branches, enter into the determination of flow. Each change thus negatively affects accuracy of measurement.

According to the invention, this problem is overcome by providing means 49, which determine, on the basis of the first and second, conditioned reference signals R1, R2, a ratio of the gains V of the first and second signal processing branches 37, 39, and by providing means 51 for determining the flow M, which means determine the flow M on the basis of the first and second measurement signals $U_\Delta$, $U_\Sigma$, and, in such case, take into consideration the ratio of the gains V. Since, in both cases, a digital signal processing is involved, both the means 49, which determine the ratio of the gains V of the first and second signal processing branches 37, 39, and also the means 51 for determining the flow M are preferably integrated into the digital signal processing unit 45.

The first signal $S_\Delta$ corresponds, in the case of the example of an embodiment presented in FIG. 3, to the amplified, digitized difference between the impedance-converted, preamplified, first sensor signal S1 and the impedance-converted, preamplified, auxiliary signal H, with H= S2+/−R, i.e.

$S_\Delta = [S1g\ g_{v1} - (S2 +/- R)g\ g_{v2}] g_\Delta g_{A/D\Delta}$ wherein the following definitions hold:
S1 and S2 first and second sensor signals;
R reference signal;
g gain of the impedance-converter 31;
$g_{v1}$ controlled gain of the first preamplifier 33;
$g_{v2}$ fixed gain of the second preamplifier 35;
$g_\Delta$ gain of the difference amplifier 41; and
$g_{A/D\Delta}$ gain of the analog-digital converter $A/D_\Delta$.

In such case, the auxiliary signal H is a superimposing of the second sensor signal S2 and the reference signal R, which is implemented e.g. by summing, i.e. H=S2+R, or by difference formation, i.e. H=S2−R. Both forms of superimposing are of equal value.

The second signal $S_\Sigma$ corresponds, in the case of the example of an embodiment presented in FIG. 3, to the digitized sum of the impedance-converted, preamplified, first sensor signal S1 and the impedance-converted, preamplified, auxiliary signal H, with H=S2+/−R, i.e.

$S_\Sigma = [S1g\ g_{v1} + (S2 +/- R)g\ g_{v2}] g_\Sigma g_{A/D\Sigma}$ wherein the following definitions hold:
S1 and S2 first and second sensor signals;
R reference signal;
g gain of the impedance-converter 31;
$g_{v1}$ controlled gain of the first preamplifier 33;
$g_{v2}$ fixed gain of the second preamplifier 35;
$g_\Sigma$ gain of the adder 47; and
$g_{A/D\Sigma}$ gain of the analog-digital converter $A/D_\Sigma$.

In the case of the above-described alternative, in which no addition of the first sensor signal S1 occurs in the second signal branch 39, the corresponding term S1 g $g_{v1}$ in the brackets in the above formula for the second signal $S_\Sigma$ would not appear.

For the variant shown in FIG. 4, the following correspondingly applies:

$S_\Delta = [S1g\ g_{v1} - (S2\ g +/- R)g_{v2}] g_\Delta g_{A/D\Delta}$ $S_\Sigma = [S1g\ g_{v1} + (S2\ g +/- R)g_{v2}] g_\Sigma g_{A/D\Sigma}$ since the reference signal R does not pass through the impedance converter 31 placed in this variant in front of the second signal processing branch 39. Also, in this case, where, in the above-described alternative, there is in the second signal branch 39 no addition of the first sensor signal S1, the corresponding term S1 g $g_{v1}$ in the brackets in the above formula for the second signal $S_\Sigma$ would not appear.

The filters FR1 and FR2 filter from the first and second signals $S_\Delta$ and $S_\Sigma$ first and second, conditioned, reference signals R1, R2, i.e. those components are filtered out that exhibit the reference frequency $f_R$. Therewith, the following formula results for the first, conditioned, reference signal R1 of the variant displayed in FIG. 3:

$R1 = -/+R\ g g_{v2}\ g_\Delta g_{A/D\Delta}$

Correspondingly, the following applies for the variant displayed in FIG. 4:

$R1 = -/+R\ g_{v2} g_\Delta g_{A/D\Delta}$

The formula for the conditioned, second reference signal R2 in the variant of FIG. 3 is:

$R2 = +/-R\ g\ g_{v2} g_\Sigma g_{A/D\Sigma}$

And, correspondingly for the variant of FIG. 4, the following applies:

$R2 = +/-R\ g_{v2} g_\Sigma g_{A/D\Sigma}$

The conditioned reference signals R1, R2 also exhibit this form, when no addition of the first sensor signal S1 was done in the second signal branch 39.

The ratio V of the gains of the first and second signal processing branches 37, 39 then results immediately from the magnitude of the quotient of the first and second, conditioned, reference signals R1, R2. The following formula results:

$$V = |R1/R2| = \frac{g_\Delta g_{A/D\Delta}}{g_\Sigma g_{A/D\Sigma}}$$

This ratio, or what is equivalent thereto, its reciprocal 1/V, is determined in the signal processing unit 45 using the means 49.

The filters $FS_\Delta$ and $FS_\Sigma$ filter from the first and second signals $S_\Delta$ and $S_\Sigma$ first and second measurement signals $U_\Delta$ and $U_\Sigma$, i.e. those components are filtered out, that exhibit the frequency $f_s$ of the sensors. Therewith results, for the first measurement signal $U_\Delta$:

$U_\Delta = [S1g\ g_{v1} - S2\ g\ g_{v2}] g_\Delta g_{A/D\Delta}$

And, for the second measurement signal $U_\Sigma$:

$U_\Sigma = [S1g\ g_{v1} + S2\ g\ g_{v2}] g_\Sigma g_{A/D\Sigma}$

In the case of the above-described alternative, in which there is no addition of the first signal S1 in the second branch 39, the corresponding term S1 g, $g_{v1}$ in the brackets in the above formula would, naturally, also be omitted in the above-formula for the second measurement signal $U_\Sigma$.

Using the means 51, the flow M is now determined, by determining an imaginary part Im(U$_A$) of the first measurement signal U$_A$ and a magnitude |U$_\Sigma$| of the second measurement signal U$_\Sigma$. The determining of the flow rate M then occurs analogously to the determination described in the introductory description, wherein in place of the previously implicitly calibrated and stored constants of the gains of the signal processing branches 37, 39, the actual, measured ratio V of the gains is used. The flow rate M is then determined on the basis of the first and second measurement signals U$_A$, U$_\Sigma$ and the actually measured ratio of the amplification gains by $$M = k \frac{Im(U_A)}{|U_\Sigma| f_s} \frac{1}{V}$$

wherein the following definitions hold:
k a proportionality constant; and
f$_s$ frequency of the sensor signals S1, S2.

In the case of this method for determining the flow rate M using the Coriolis flow meter of the invention, the flow rate M is proportional to the ratio of the imaginary part Im(U$_A$) of the first measurement signal U$_A$ and the magnitude |U$_\Sigma$| of the second measurement signal and inversely proportional to the ratio of the gains V.

Figure 5:
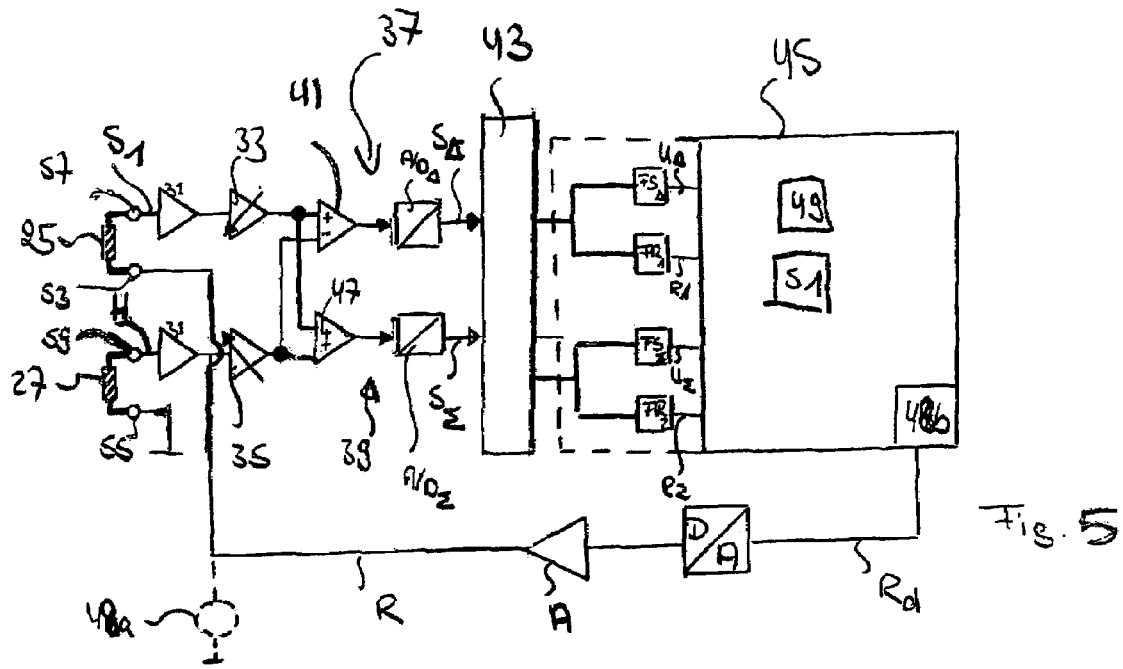
FIG. 5 a signal processing of the invention, in a Coriolis flow meter, in which a reference signal generator is connected to the coil of the first sensor.
Figure 6:
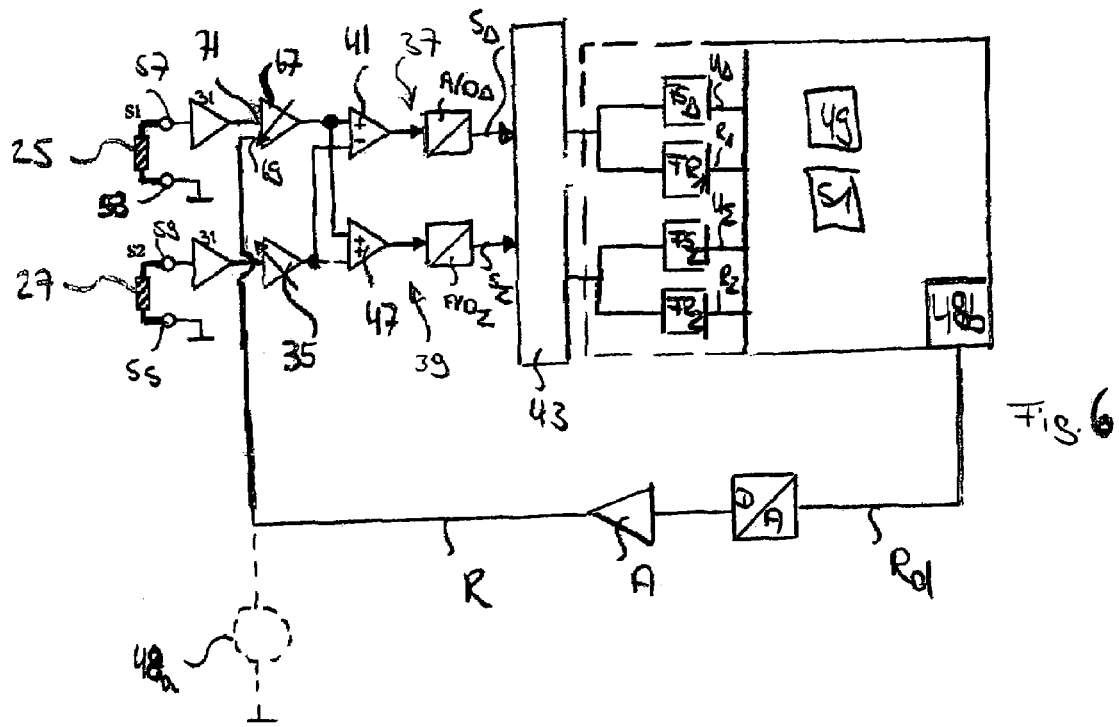
FIG. 6 a further signal processing of the invention, in a Coriolis flow meter, in which the reference signal is superimposed on the first sensor signal via a difference amplifier.

FIGS. 5 and 6 show two further examples of embodiments of signal processing in Coriolis flow meters of the invention, which can be used, for example, in connection with the measurement pickup shown in FIG. 1. They differ from the examples of embodiments presented in FIGS. 3 and 4 only in that the reference signal R is not superimposed on the second sensor signal S2, but, instead, on the first sensor signal S1. Reference signal R lies, in the case of the example of an embodiment shown in FIG. 5, on the first terminal 53 of the coil 25 of the first sensor 21.

In the case of the signal processing presented in FIG. 6, the superimposing is effected via a summing- or difference-amplifier placed in front of the first signal processing branch 37. The summing- or difference-amplifier can, in such case, be an additional element, which is inserted into the circuit. Preferably, however, a controllable summing- or difference-amplifier 67 is used, which occurs in the place of the preamplifier 33. The reference signal R lies on a first input 69 of the difference amplifier 67 connected in front of the first signal processing branch 37. The coils 25, 27 lie via their first terminals 53, 55 at ground or at a reference potential. The second terminal 57 of coil 25 is connected via the impedance converter 31 with a second input 71 of the summing- or difference-amplifier 67 placed before the first signal processing branch 37.

In the case of the signal processings shown in FIGS. 5 and 6, in the first signal processing branch 37, a first signal S$_\Delta$ is derived and conditioned on the basis of the auxiliary signal H formed by the superimposing of the reference signal R on the first sensor signal S1 and on the basis of the second sensor signal S2, with the first signal S$_\Delta$ corresponding to the difference of the auxiliary signal and the second sensor signal S2. In the second signal processing branch 39, a second signal S$_\Sigma$ is derived and conditioned on the basis of the auxiliary signal H and the second sensor signal S2, with the second signal S$_\Sigma$ corresponding to the sum of the auxiliary signal H and the second sensor signal S2. Alternatively, it is possible here, analogously to the explanations for FIGS. 3 and 4, not to use the sum formation, but, instead, deriving and conditioning in the second signal processing branch 39 a second signal S$_\Sigma$, which corresponds to the auxiliary signal H. Instead of the adder 47, an amplifier is then used, which amplifies the auxiliary signal H with the gain g$_{v2}$. The dashed connection shown in FIGS. 5 and 6 between the preamplifier 35 and the second signal processing branch 39 is then omitted.

The above-described alternative, wherein, in the second signal processing branch 39, instead of a sum formation, only the second sensor signal S2 is amplified and conditioned, is, in this case, not available, since then the ratio V of the gains can not, in such case, be determined in the above-described manner.

In the case of the examples of embodiments shown in FIGS. 5 and 6, in manner exactly as in the case of the above-described examples of embodiments, two, preferably identical, sets of, in each case, two filters FS$_\Delta$, FR1; FS$_\Sigma$, FR2, of which a first set serves for filtering from the conditioned, first signal S$_\Delta$ a conditioned first reference signal R1 and a first measurement signal U$_A$ corresponding to the difference of the sensor signals S1, S2, and of which a second set serves for filtering from the conditioned second signal S$_\Sigma$ a conditioned second reference signal R2 and a second measurement signal U$_\Sigma$. Also here, again means 49, which determine a ratio V of the gains of the first and second signal processing branches 37, 39 on the basis of the first and second, conditioned, reference signals R1, R2, and means 51 for determining the mass flow rate M on the basis of the first and second measurement signals U$_A$, U$_\Sigma$, are provided, which take into consideration the ratio V of the gains.

The first signal S$_\Delta$ corresponds in the case of the variant shown in FIG. 5, to the amplified, digitized difference of the impedance-converted, preamplified, auxiliary signal H, with H=S1+/−R, and the impedance-converted, preamplified, second sensor signal S2, i.e.

$$S_\Delta = [(S1+/-R)g \; g_{v1} - S2g \; g_{v2}] g_\Delta g_{A/D\Delta}$$

For the variant shown in FIG. 6, the following formula applies:

$$S_\Delta = [(S1g+/-R)g_{v1} - S2g \; g_{v2}] g_\Delta g_{A/D\Delta}$$

The second signal S$_\Sigma$ corresponds, in the case of the variant shown in FIG. 5, to the digitized sum of the impedance-converted, preamplified, auxiliary signal H, with H=S1+/−R, and the impedance-converted, preamplified, second sensor signal S2, i.e.

$$S_\Sigma = [(S1+/-R)g \; g_{v1} + S2g \; g_{v2}] g_\Sigma g_{A/D\Sigma}$$

For the variant shown in FIG. 6, the following formula applies:

$$S_\Sigma = [(S1g+/-R)g_{v1} + S2g \; g_{v2}] g_\Sigma g_{A/D\Sigma}$$

In the case of the above-described alternative, in which there is no addition of the second sensor signal S2 in the second signal branch 39, the corresponding term S2 g g$_{v2}$ in the brackets in the above formulas for the second signal S$_\Sigma$ is omitted.

The filters FR1 and FR2 filter from the first and second signals S$_\Delta$ and S$_\Sigma$ first and second, conditioned, reference signals R1, R2. Therewith results for the first, conditioned, reference signal R1 of the variant shown in FIG. 5 the following formula:

$$R1 = +/-R \; g \; g_{v1} g_\Delta g_{A/D\Delta}$$

and for the conditioned, second, reference signal R2 of the variant shown in FIG. 5 the following formula:

$$R2 = +/-R \; g \; g_{v1} g_\Sigma g_{A/D\Sigma}$$

For the variant shown in FIG. 6, the following formulas apply:

$$R1 = +/- R\, g_{v1} g_\Delta g_{A/D_\Delta} \text{ and}$$

$$R2 = +/- R\, g_{v1}\, g_\Sigma g_{A/D_\Sigma}$$

The ratio V of the gains of the first and second signal processing branches thus results directly from the quotient of the first and second, conditioned, reference signals R1, R2. Thus, the corresponding formula is:

$$V = R1/R2 = \frac{g_\Delta g_{A/D}}{g_\Sigma g_{A/D_\Sigma}}$$

The rest, especially the determining of the flow rate M, occurs in the same way as already explained in connection with FIGS. 3 and 4.

Besides the actual Coriolis flow measuring device, the invention includes also a method for determining the ratio V of the gains of two separated signal processing branches 37, 39 of a Coriolis flow meter having first and second sensors 21, 23 for the registering of an oscillation of a measuring tube 3 dependent on flow rate and for producing first and second sensor signals S1, S2. According to this method, the reference signal R is, as already described above on the basis of the Coriolis flow meter of the invention, superimposed either on the second sensor signal S2 (see FIGS. 3 and 4) or on the first sensor signal S1 (see FIGS. 5 and 6).

In the first case, in the first signal processing branch 37, a first signal $S_\Delta$ is derived and conditioned, which corresponds to a difference of the first sensor signal S1 and the auxiliary signal H. In the second signal processing branch 39, a second signal $S_\Sigma$ is derived and conditioned, which corresponds to a sum of the first sensor signal S1 and the auxiliary signal H or to the auxiliary signal H.

In the second case, in the first signal processing branch 37, a first signal $S_\Delta$ is derived and conditioned, which corresponds to a difference of the auxiliary signal H and the second sensor signal S2. In the second signal processing branch 39, a second signal $S_\Sigma$ is derived and conditioned, which corresponds to a sum of the auxiliary signal H and the second sensor signal S2 or to the auxiliary signal H.

From the first and second signals $S_\Delta$, $S_\Sigma$, first and second, conditioned, reference signals R1, R2 are filtered out. Then, on the basis of the conditioned reference signals R1, R2, the ratio V of the gains of the signal processing branches 37, 39 is, as already explained above, determined.

The gains of the individual components of the signal processing branches 37, 39 change, as a rule, very slowly, since aging phenomena and temperature changes occur only very slowly in comparison to flow rate, or its changes.

Correspondingly, the accuracy, with which the ratio V of the gains is determined, can be improved by determining the ratio V of the gains a plurality of times, calculating the average value, and using such in place of the separate measurements. Correspondingly, the flow rate M is then determined on the basis of the average value of the ratio V.

Disturbances, which have frequencies in the region of the frequency $f_R$ of the reference signal R, can degrade the accuracy with which the ratio V of the gains can be measured. Disadvantages of this type can be avoided by determining the ratio V of the gains a plurality of times, and by determining a distribution of the ratio V. The separate ratios V, or their average value, are then always considered reliable, when the ratio V is normally distributed and a standard deviation of the ratios V lies below a predetermined value. Correspondingly, flow rate M is determined preferably only then on the basis of the measured ratio V or an average value of the ratios, when the ratios are normally distributed and a standard deviation of the ratios lies below a predetermined value.

To the extent that the measured ratio, or its average value, proves to be unreliable due to the above condition, e.g. as a result of a momentary disturbance, then preferably for this period of time one can, as mentioned in the introduction, fall back to earlier, implicitly calibrated and stored constants of the gains of the signal processing branches 37, 39, or to the ratio V which was last reliably determined. The actually measured ratio V of the gains is followed further, and only again used, when it appears reliable.

In the above explanations, the measured ratio V of the gains, or its average value, is used directly for determining flow rate M. In this way of proceeding, the current, measured ratio, or its average value, is preferably stored regularly, persistently. This offers the advantage that, in the case of a restarting of the flow meter M, the last-stored ratio V can be used, without having to wait for the settling of the total system.

Alternatively, naturally also a reference value $V_R$ can be stored for the ratio of the gains in the flow measuring device, which reference value is then compared with the measured ratio V of the gains. If a deviation arises between the measured ratio V and the reference value $V_R$, then a compensation is conducted and the stored reference value $V_R$ is adjusted, if required.

| | |
|---|---|
| 1. | measurement pickup, or transducer |
| 3 | measuring tube |
| 5 | end plate |
| 7 | flange |
| 9 | end plate |
| 11 | flange |
| 13 | support tube |
| 15 | oscillation exciter |
| 17 | permanent magnet |
| 19 | coil |
| 21 | sensor |
| 23 | sensor |
| 25 | coil |
| 27 | coil |
| 29 | permanent magnet |
| 31 | impedance converter |
| 33 | preamplifier |
| 35 | preamplifier |
| 37 | first signal processing branch |
| 39 | second signal processing branch |
| 41 | difference amplifier |
| 43 | interface |
| 45 | digital signal processing unit |
| 47 | adder |
| 48a | analog reference signal generator |
| 48b | digital reference signal generator |
| 49 | means for determining ratio |
| 51 | means for determining flow |
| 53 | first terminal |
| 55 | first terminal |
| 57 | second terminal |
| 59 | second terminal |
| 61 | summing or difference amplifier |
| 63 | first input |
| 65 | second input |
| 67 | summing or difference amplifier |
| 69 | first input |
| 71 | second input |

The invention claimed is:

1. A coriolis flow meter, comprising:
at least one measuring tube, which is excited to oscillate during measurement operation, and through which a medium flows, whose flow is to be measured;
first and second sensors for registering a flow-dependent oscillation of said measuring tube and for producing first and second sensor signals;
a reference signal generator, which superimposes a reference signal on the second sensor signal;
a first signal processing branch, which, on the basis of said first sensor signal and an auxiliary signal formed by the superimposing of said reference signal on said second sensor signal, derives and conditions a first signal corresponding to a difference of said first sensor signal and said auxiliary signal;
a second signal processing branch, which, on the basis of said auxiliary signal or on the basis of said first sensor signal and said auxiliary signal, derives and conditions a second signal;
two sets of, in each case, two filters, of which a first set serves for filtering from said conditioned first signal a conditioned, first, reference signal and a first measurement signal corresponding to a difference of said sensor signals and of which a second set serves for filtering from said conditioned, second signal a conditioned second reference signal and a second measurement signal;
means, which determine, on the basis of said first and second, conditioned, reference signals, a ratio of the gains of said first and second signal processing branches; and
means for determining flow on the basis of said first and second measurement signals, and on the basis of said ratio of the gains.

2. The coriolis flow meter as claimed in claim 1, wherein:
said second signal is equal to a sum of said first sensor signal and the auxiliary signal, or
a phase angle between said first and second sensor signals is less than a few tens of milli-radians and said second signal is equal to said auxiliary signal.

3. The coriolis flow meter as claimed in claim 1, wherein:
said first signal processing branch has a difference amplifier and an analog-digital converter; and
said second signal processing branch has an adder or an amplifier and an analog-digital converter.

4. The coriolis flow meter as claimed in claim 1, wherein:
said sensors comprise, in each case, a coil, said reference signal generator is connected with a first terminal of one of said coils of said second sensor; and
a second terminal of said one of said coils is connected with an input of said second signal processing branch.

5. The coriolis flow meter as claimed in claim 1, wherein:
an impedance converter and a preamplifier are arranged between said second terminal of said other of said coil of said first sensor and the input of the first signal processing branch and a preamplification of the first sensor signal is controlled in such a manner that a real part of the first measurement signal disappears; and
an impedance converter and a preamplifier of predetermined gain are arranged between said second terminal of said one of said coils of said second sensor and the input of the second signal processing branch.

6. The coriolis flow meter as claimed in claim 1, wherein:
there is placed before said second signal processing branch a summing or difference amplifier; and on whose inputs said second sensor signal and said reference signal are applied, and on whose output said auxiliary signal is available.

7. The coriolis flow meter, comprising:
at least one measuring tube, which is excited to oscillate during measurement operation, and through which a medium flows, whose flow is to be measured;
first and second sensors for registering a flow-dependent oscillation of said measuring tube and for producing first and second sensor signals;
a reference signal generator, which superimposes a reference signal on said first sensor signal;
a first signal processing branch, which, on the basis of an auxiliary signal, formed by the superimposing of said reference signal on said first sensor signal, and said second sensor signal, derives and conditions a first signal corresponding to a difference of said auxiliary signal and said second sensor signal;
a second signal processing branch, which, on the basis of said auxiliary signal or on the basis of said auxiliary signal and said second sensor signal, derives and conditions a second signal;
two sets of, in each case, two filters, of which a first set serves for filtering from the conditioned first signal a conditioned, first reference signal and a first measurement signal corresponding to a difference of said sensor signals and of which a second set serves for filtering from the conditioned, second signal a conditioned second reference signal and a second measurement signal;
means, which determine, on the basis of said first and second, conditioned, reference signals, a ratio of the gains of said first and second signal processing branches; and
means for determining flow on the basis of said first and second measurement signals and on the basis of said ratio of the gains.

8. A method for determining flow and a ratio of amplification gains of two separated signal processing branches of a Coriolis flow meter, having first and second sensors for registering a flow-dependent oscillation of a measuring tube and for producing first and second, sensor signals, and for determining flow, comprising the steps of:
superimposing a reference signal on the second sensor signal;
deriving and conditioning a first signal in the first signal processing branch, which corresponds to a difference of the first sensor signal and an auxiliary signal formed by the superimposing of the reference signal on the second sensor signal; deriving and conditioning a second signal in the second signal processing branch, which corresponds to a sum of the first sensor signal and the auxiliary signal, or to the auxiliary signal,
filtering first and second conditioned reference signals from the first and second signals;
determining a ratio of the amplification gains of the signal processing branches on the basis of the conditioned reference signals; and
determining flow on the basis of said determined ratio of the amplification gains.

9. The method as claimed in claim 8, wherein:
the flow is proportional to a ratio of an imaginary part of the first measurement signal and a magnitude of the second measurement signal and inversely proportional to the ratio of the gains.

10. The method as claimed in claim 9, wherein:

the ratio of the gains is determined a plurality of times; and the flow is determined on the basis of an average value of the ratio.

11. The method as claimed in claim 9, wherein:

the ratio of the gains is determined a plurality of times;

a distribution of the ratios is determined; and the flow is only determined on the basis of an average value of the ratio, when the ratios are normally distributed and a standard deviation of the ratios lies below a predetermined value.

12. The method as claimed in claim 9, wherein:

a reference value is stored in the flow measuring device for the ratio of the gains;

the measured ratio of the gains is compared with the reference value, and upon the occurrence of a deviation, a compensation is performed.

13. Method for determining flow and a ratio of amplification gains of two separated signal processing branches of a Coriolis flow meter, having first and second sensors for registering a flow-dependent oscillation of a measuring tube and for producing first and second, sensor signals, and for determining flow; comprising the steps of:

superimposing a reference signal on the first sensor signal;

deriving and conditioning a first signal in the first signal processing branch, which corresponds to a difference of an auxiliary signal formed by the superimposing of the reference signal on the first sensor signal, on the one hand, and the second sensor signal, on the other hand;

deriving and conditioning a second signal in the second signal processing branch, which corresponds to a sum of the auxiliary signal and the second sensory signal, or to the auxiliary signal;

filtering first and second conditioned reference signals from the first and second signals;

determining a ratio of the amplification gains of the signal processing branches on the basis of the conditioned reference signals; and determining flow on the basis of said determined ratio of the amplification gains.

14. The method as claimed in claim 13, wherein:

the flow is proportional to a ratio of an imaginary part of the first measurement signal and a magnitude of the second measurement signal and inversely proportional to the ratio of the gains.

15. The method as claimed in claim 13, wherein:

the ratio of the gains is determined a plurality of times; and the flow is determined on the basis of an average value of the ratio.

16. The method as claimed in claim 13, wherein:

the ratio of the gains is determined a plurality of times; a distribution of the ratios is determined; and the flow is only determined on the basis of an average value of the ratio, when the ratios are normally distributed and a standard deviation of the ratios lies below a predetermined value.

17. The method as claimed in claim 13, wherein:

a reference value is stored in the flow measuring device for the ratio of the gains;

the measured ratio of the gains is compared with the reference value, and upon the occurrence of a deviation, a compensation is performed.

* * * * *